United States Patent [19]

Wallace

[11] 4,453,638
[45] Jun. 12, 1984

[54] HYDRAULIC SHOCK ABSORBER

[76] Inventor: Christopher D. Wallace, 8291 Honey La., Canton, Mich. 48187

[21] Appl. No.: 423,806

[22] Filed: Sep. 27, 1982

[51] Int. Cl.³ ............................................. F16F 9/10
[52] U.S. Cl. .................................. 188/282; 188/319; 188/314
[58] Field of Search .............. 188/275, 281, 282, 299, 188/285, 317, 314, 319; 137/494

[56] References Cited

U.S. PATENT DOCUMENTS 2,005,813  6/1935  Thorsen ............................ 137/494
2,352,197  6/1944  Harvey ............................. 188/282

FOREIGN PATENT DOCUMENTS 1219963  6/1966  Fed. Rep. of Germany ...... 188/282
1365869  9/1974  United Kingdom ............... 188/282
1440388  6/1976  United Kingdom ............... 188/282

Primary Examiner—Bruce H. Stoner, Jr.
Assistant Examiner—Alvin Oberley
Attorney, Agent, or Firm—Barnes, Kisselle, Raisch, Choate, Whittemore & Hulbert

[57] ABSTRACT

A hydraulic shock absorber comprising a piston and hollow piston rod slidable within a cylinder, and a plug assembly including a spool valve for metering fluid into the piston rod when an impact force forces the piston into the cylinder. A coil spring normally biases the valve spool to block fluid passage. An adjustment rod is threaded into the plug assembly to form a seat for the valve spring, and extends through the hollow piston rod. The adjustment rod may be rotated from externally of the piston rod for varying spring bias on the valve spool. A closed cell sponge is disposed within the plug-remote end of the piston rod.

10 Claims, 4 Drawing Figures

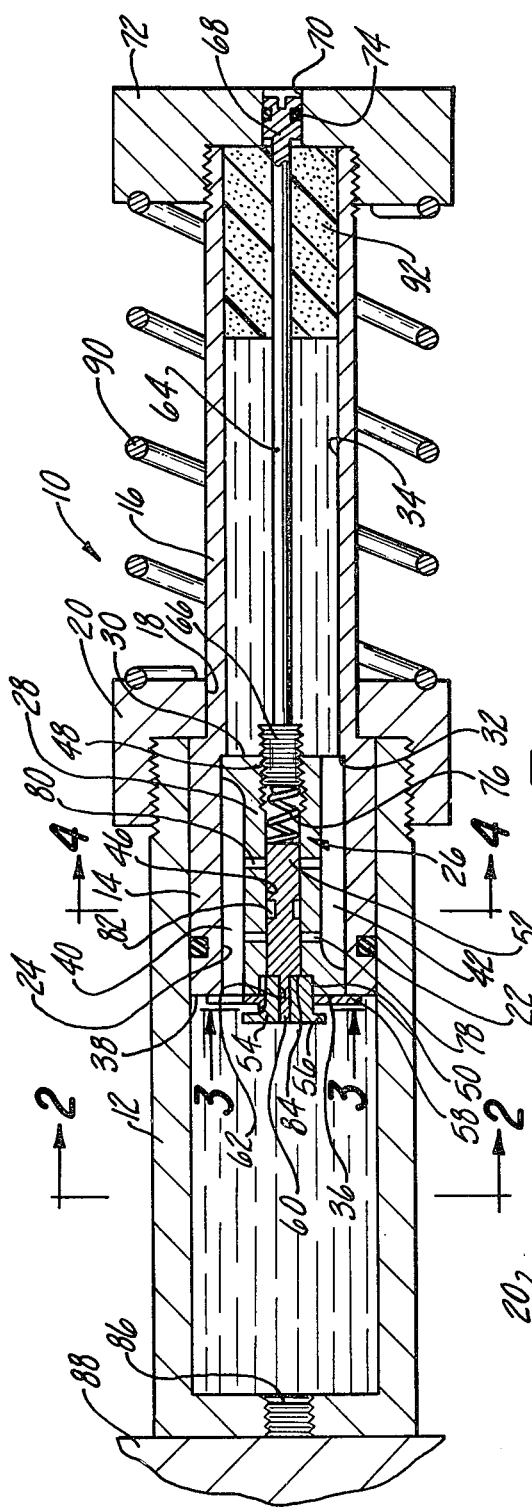
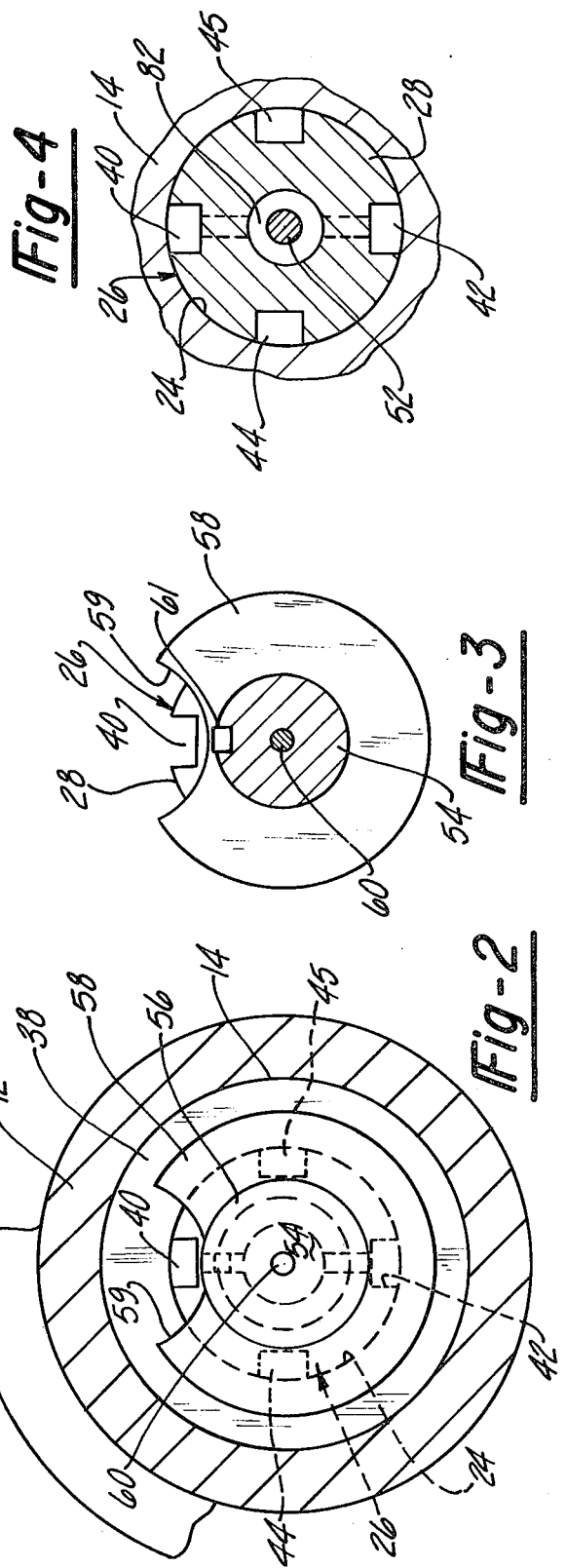

HYDRAULIC SHOCK ABSORBER

This invention relates to a hydraulic shock absorber of the piston-cylinder type and, more specifically, to a shock absorber wherein the impact force of a moving object is absorbed by causing a piston to displace hydraulic fluid from a cylinder through metering orifices.

A general object of the present invention is to provide an improved shock absorber of the described type which is of simple and economical construction, which includes few moving parts and which is reliable over an extended operating lifetime.

A more specific object of the invention is to provide a hydraulic shock absorber of the type described wherein the size of the metering orifices is automatically adjusted during operation of a function of the hydraulic pressure generated in the cylinder by the impact force on the piston, so that impact loads of various magnitudes can be decelerated uniformly and smoothly.

Other objects, features and advantages of the present invention will become apparent from the following description and accompanying drawings in which:

FIG. 1 is a longitudinal sectional view of a shock absorber according to the present invention; and FIGS. 2, 3 and 4 are sectional views taken along the lines 2—2, 3—3 and 4—4, respectively, in FIG. 1.

Referring to the drawings, a presently preferred embodiment of a shock absorber in accordance with the present invention is illustrated. The shock absorber, generally designated 10, includes a cylinder 12 in which a piston 14 is slidably arranged. The rod 16 of piston 14 extends through an opening 18 in an end cap 20 which is threaded over and closes the open end of cylinder 12. Piston 14 is sealed within the bore of cylinder 12 by means of an O-ring 22. However, the outer periphery of rod 16 does not form an airtight seal with opening 18.

Piston 14 is formed with a coaxial through bore 24 which telescopically receives a metering plug assembly 26. Metering plug assembly 26 comprises a cylindrical plug 28 press fitted into bore 24 and having an inner end face 30 abutting against a shoulder 32 formed at the junction of bore 24 and the coaxial bore 34 in piston end 16. The opposite end face 36 of plug 28 is coplanar with the adjacent end face 38 of piston 14. Plug 28 is formed on its outer periphery with a first pair of axially extending and diametrically opposed channel-forming passageways 40,42. Passageway 40 is closed at one end adjacent face 30 of plug 28 and is open at face 36 of the plug. Channel 42 is closed at face 36 of the plug and is open at face 30. Plug 28 is formed with a second pair of axially extending and diametrically opposed channel-forming passageways 44,45 which are illustrated in FIG. 2. Passageways 44,45 extend to and are open at opposite ends of plug 28. Passages 40,42,44,45 are uniformly separated by angles of 90°, as best seen in FIG. 4.

Plug 28 is also formed with a coaxial bore 46 which is threaded at one end 48 contiguous with end face 30, and which is counterbored at its opposite end 50 adjacent to end face 36. Within bore 46 there is slidably arranged a valve spool 52, and within counterbore 50 there is press fitted a cylindrical end cap 54. End cap 54 is provided with a radially enlarged flange 56 at its outer end which is spaced from the adjacent end face 36 of plug 28. A disc 58, which serves as a check valve, is slidably arranged on end cap 54 between flange 56 and the end face 36 of plug 28. An arcuate notch 59 on the periphery of disc 58 is axially aligned with, and provides fluid access to, passageway 40. Disc 58 is keyed at 61 to end cap 54 to prevent rotation but permit axial sliding motion with respect thereto.

One end of spool 52 is formed with an axially extending stem 60 slidably received with a close fit in a bore 62 formed in end cap 54. An axially extending adjusting rod 64 has its inner end 66 in threaded engagement with the threads 48 at the inner end of plug 28. The opposite end of rod 64 is formed with a slotted head 68 disposed within a bore 70 formed in an impact button 72 which is threaded on and closes the open end of piston rod 16. Head 68 is sealed in bore 70 by an O-ring 74. Valve spool 52 is urged into abutting relation with end cap 54 by a light compression spring 76. Threaded end 66 of rod 64 forms a seat for spring 76, so that the tension of spring 76 can be adjusted by rotating rod 64 in opposite directions.

Plug 28 is formed with two axially spaced passageways 78,80 extending radially therethrough. At one end, these passageways open into the axially extending passageway 40 on plug 28, and at their opposite ends they communicate with the axially extending passageway 42 on the plug. Spool 52 is formed with an annular groove 82. Passageways 78,80 and groove 82 are preferably disposed relative to one another such that, when spool 52 is displaced in a direction to the right (as seen in FIG. 1) within bore 46, groove 82 begins to register radially with passageway 80 when the end face 84 of the spool begins to register radially with passageway 78.

Cylinder 12 and piston rod 16 are adapted to be filled with hydraulic fluid by means of a fill plug 86 at the closed end of the cylinder. Cylinder 12 is fixedly mounted on a support structure 88 which, in the illustrated embodiment, retains the shock absorber in a horizontally extending orientation. A light compression spring 90 is arranged between impact button 72 and end cap 20. A sponge 92 of closed cell resilient elastomeric construction is disposed within bore 34 of piston rod 16.

In operation, when piston 14 is in the fully extended position illustrated in FIG. 1, the interior of cylinder 12 communicates freely with the bore 34 through passageways 44,45 since, at this time, valve disc 58 is not biased to close these passageways. Thus, the pressure of the hydraulic fluid is the same in both of these chambers. However, when a moving body axially abuts the impact button 72, the impact force tends to displace piston 14 in a direction to the left as viewed in FIG. 1. When this occurs, valve disc 58 closes passageways 44,45 so that, at least momentarily, fluid communication between the interior of cylinder 12 and bore 34 is cut off. The hydraulic pressure generated within cylinder 12 is directly proportional to the magnitude of the shock force applied to the impact button 72. Since the outer end of stem 60 is subjected to the hydraulic pressure generated within cylinder 12, spool 52 is displaced in bore 46 in a direction toward the right against the bias of spring 76. When spool 52 has been displaced sufficiently such that the end face 84 of the spool begins to register with radial passageway 78 and the annular groove 82 begins to register with radial passageway 80, hydraulic fluid begins to flow from within cylinder 12 into bore 34 through a fluid path defined by notch 59, axial passageway 40, radial passageways 78,80 and axial passageway 42. This enables piston 14 to be advanced into the cylinder at a rate determined by the rate of fluid flow through the above-defined path. Radial passageways 78,80 and valve spool 52 cooperate to provide variable sized metering orifices which effectively determine the rate of fluid flow across the piston head. The size of these orifices is determined by the magnitude of the impact force on impact button 72 and the biasing force exerted on spool 52 by spring 76. With a given impact load, if the bias of spring 76 is increased, passageways 78,80 will be opened to a lesser extent and piston 14 will advance into cylinder 12 at a slower rate. If rod 64 is rotated to decrease the bias of spring 76, then the same magnitude of impact force on impact button 72 will open passageways 78,80 to a greater extent and permit the piston to be displaced in a faster rate. Thus, as soon as an impact force of a moving object is applied axially to impact button 72, the pressure within cylinder 12 increases to a relatively high valve and displaces spool 52 so that the passageways 78,80 are relatively widely open. However, as soon as fluid begins to flow across the piston, the pressure within cylinder 12 diminishes so that spool 52 moves in a direction tending to reduce the size of passageways 78,80. In this manner, the moving object which abuts impact button 72 is decelerated smoothly until the impact force is completely absorbed.

In the above-described arrangement, hollow piston rod 16 forms a reservoir or accumulator chamber for the fluid displaced from within cylinder 12. Since the diameter of bore 34 is smaller than the bore of the cylinder, the closed cell sponge 92 provides the important function of increasing the effective size of bore 34 to accommodate the fluid displaced into the bore. Sponge 92 accomplishes this by simply compressing to reduce its size.

When the shock force on impact button 72 is removed, the hydraulic pressure in cylinder 12 drops to a very low value which causes spool 52 to assume the blocking position illustrated in FIG. 1. The return spring 90 then biases the piston in a retracting direction so that the pressure of the fluid in bore 34 is at least slightly greater than in cylinder 12. This causes the check valve disc 58 to open and permits the fluid in cylinder 34 to flow freely through passageways 44,45 back into the cylinder. Therefore, spring 90 need only be sufficiently strong to retract the piston. Likewise, since stem 60 is of relatively small diameter, spring 76 can also be of relatively light weight, even though the pressures generated within cylinder 12 by the impact forces directed against the impact button 72 may be of a relatively high magnitude, such as when a heavy truck backs into a loading dock on which the shock absorber is mounted.

The invention claimed is:

1. A hydraulic shock absorber comprising a hydraulic cylinder, a hollow piston movable axially into said cylinder in one direction when an impact force is applied axially to said piston, the interior of said hollow piston forming a fluid reservoir into which fluid is displaced from said cylinder in response to movement of said piston in said one direction, a flow metering device in said piston forming the sole means for permitting fluid flow from the cylinder into said reservoir when said piston moves in said one direction, said metering device comprising a bore in said piston, a first passageway in said piston communicating at one end with the cylinder and at the opposite end with said bore, a second passageway in said piston communicating at one end with said bore and at the opposite end with said reservoir, a valve spool slidably arranged in said bore and having one end thereof exposed to the pressure of the hydraulic fluid in said cylinder such that said spool is adapted to be displaced in a direction opposite to said one direction in response to increase in hydraulic pressure in said cylinder, spring means biasing said spool in said one direction normally to block the fluid flow through said passageways from said cylinder to said reservoir, displacement of said spool from said one position by hydraulic pressure in the cylinder establishing communication between said first and second passageways to an extent which varies directly with the pressure in the cylinder, and means accessible exteriorly of the piston and cylinder for adjusting the bias of said spring means on said spool.

2. A shock absorber as called for in claim 1 wherein said piston is formed with an axial second bore having one end within the interior of said cylinder, a plug fixedly retained in said second bore, the bore in which the valve spool is slidable being formed in said plug, said first and second passageways also being formed in said plug.

3. A shock absorber as called for in claim 2 wherein said first passageway is formed in part by a groove on the outer periphery of said plug extending axially from the end thereof communicating with the interior of the cylinder and the second passageway comprises a groove on the outer periphery of said plug extending axially from the opposite end of said plug.

4. A shock absorber as called for in claim 3 wherein said first and second passageways also include aligned radial openings extending from each said groove to the bore in which the valve spool is slidable.

5. The shock absorber set forth in claim 3 further comprising a third passageway formed by an additional groove on the outer periphery of said plug extending axially from said one end to said opposite end, and a check valve carried by said plug within said cylinder for blocking fluid flow from within said cylinder through said third passageway in response to motion of said piston to said one direction.

6. The shock absorber set forth in claim 5 wherein said check valve comprises a disc and means mounting said disc for movement externally of said plug adjacent said one end, said disc having an opening in axial alignment with said first passageway for permitting fluid flow thereto in all positions of said disc, a portion of said disc being adapted to block fluid passage to said third passageway when said disc abuts said plug.

7. The shock absorber set forth in claim 1 wherein said bias adjusting means comprises a rod extending axially through said reservoir having one end adjustably positioned in said bore forming a seat for said spring means and a second end accessible at an end of said hollow piston reservoir remote from said cylinder for varying the position of said one end within said bore.

8. The shock absorber set forth in claim 7 wherein said one end of said rod is adjustably threadably received within said bore.

9. The shock absorber set forth in claim 8 further comprising resilient compressible means disposed in said hollow piston reservoir.

10. The shock absorber set forth in claim 9 wherein said resilient compressible means comprises a closed cell sponge.

* * * * *